(12) United States Patent
Chang

(10) Patent No.: US 11,637,376 B2
(45) Date of Patent: Apr. 25, 2023

(54) ANTENNA PACKAGED SUBSTRATE AND MANUFACTURING METHOD THEREOF, PACKAGED ANTENNA, AND TERMINAL

(71) Applicant: HUAWEI TECHNOLOGIES CO., LTD., Guangdong (CN)

(72) Inventor: Ming Chang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 146 days.

(21) Appl. No.: 17/351,304

(22) Filed: Jun. 18, 2021

(65) Prior Publication Data
US 2021/0313696 A1 Oct. 7, 2021

Related U.S. Application Data

(63) Continuation of application No. PCT/CN2018/122094, filed on Dec. 19, 2018.

(51) Int. Cl.
*H01Q 1/22* (2006.01)
*H01Q 9/04* (2006.01)

(52) U.S. Cl.
CPC ......... *H01Q 9/0414* (2013.01); *H01Q 1/2283* (2013.01)

(58) Field of Classification Search
CPC .................................................. H01Q 9/0414
(Continued)

(56) References Cited

U.S. PATENT DOCUMENTS

| 5,382,959 A | 1/1995 | Pett et al. |
| 2008/0238793 A1 | 10/2008 | Channabasappa |

(Continued)

FOREIGN PATENT DOCUMENTS

| CN | 102074801 A | 5/2011 |
| CN | 102198745 A | 9/2011 |

(Continued)

OTHER PUBLICATIONS

Rohacell: "Datasheet Rohacell HF" May 2020, pp. 1-2, XP055857291,Retrieved from the Internet:URL:https://www.rohacell.com/product/peek-industrial/downloads/ rohacell%20hf 2020 Janyary.pdf [retrieved on Nov. 2, 2021].

(Continued)

*Primary Examiner* — Peguy Jean Pierre
(74) *Attorney, Agent, or Firm* — Womble Bond Dickinson (US) LLP

(57) ABSTRACT

An antenna packaged substrate includes: a substrate, a first antenna radiating patch disposed on a surface of the substrate, a second antenna radiating patch disposed over the first antenna radiating patch, and a dielectric stack disposed between the first antenna radiating patch and the second antenna radiating patch. The dielectric stack includes a first dielectric layer, a bonding layer disposed on a side that is of the first dielectric layer and faces the first antenna radiating patch, and a second dielectric layer disposed on a side that is of the first dielectric layer and faces the second antenna radiating patch. A dielectric constant of the first dielectric layer is lower than a dielectric constant of the substrate, and an expansion coefficient of the second dielectric layer is lower than an expansion coefficient of the first dielectric layer.

20 Claims, 5 Drawing Sheets

(58) Field of Classification Search
USPC .................................................. 343/700 MS
See application file for complete search history.

(56) References Cited

U.S. PATENT DOCUMENTS

2017/0278812 A1  9/2017  Lee et al.
2019/0393172 A1* 12/2019  Pietambaram .......... H01L 24/19

FOREIGN PATENT DOCUMENTS

CN          102416728 A       4/2012
CN          107481998 A      12/2017

OTHER PUBLICATIONS

Laminated Plasctics: "Technical Data Sheet FR-5" Nov. 2021 pp. 1 1 XP055857293,Retrieved from the Internet:URL:https:// laminatedplastics.com/fr-5.pdf [retrieved on Nov. 2, 2021].
Arlon:"High Frequency, Low Loss Thermoset Laminates and Prepreg for Double Sided Multilayer and Mixed Dielectric Printed Circuit Boards Microwave Materials", Dec. 2005, pp. 1-4, XP055857297,Retrieved from the Internet: URL:https:// www.cirexx.com/wp-content/uploads/25N25FR.pdf [retrieved on Nov. 2, 2021].
Anonymous: "FR-4 Wikipedia" Nov. 2021 pp. 1-4, XP055857300,Retrieved from the Internet:URL:https://en.wikipedia.org/wiki/FR-4 [retrieved on Nov. 2, 2021].
Anonymous: "Chapter 2. Thermal Expansion", Dec. 2002, XP055751966,Retrieved from the Internet:URL:https://www.asminternational.org/documents/10192/3449965/ACFAAD6.pdf/2d574bfc-e104-48c5-8d8e-c33ffe91 c3a0 [retrieved on Nov. 18, 2020].

* cited by examiner

ANTENNA PACKAGED SUBSTRATE AND MANUFACTURING METHOD THEREOF, PACKAGED ANTENNA, AND TERMINAL

CROSS-REFERENCE TO RELATED APPLICATIONS

This application is a continuation of International Application No. PCT/CN2018/122094, filed on Dec. 19, 2018, the disclosure of which is hereby incorporated by reference in its entirety.

TECHNICAL FIELD

This application relates to the field of antenna packaging technologies, and in particular, to an antenna packaged substrate, a packaged antenna, a terminal, and a manufacturing method of an antenna packaged substrate.

BACKGROUND

With the advent of the era of high-speed communications such as 5th Generation (5G) and Virtual Reality (VR), millimeter-wave communications gradually become a focus, and millimeter-wave antenna designs and applications are increasingly demanded. Because a transmission path length of a millimeter-wave band has significant impact on signal amplitude loss, and a millimeter-wave antenna has a very high requirement on processing precision, an Antenna in Package AiP (AiP) technology that provides an extremely short antenna feeder path and high processing precision becomes one of the mainstream technologies in the millimeter-wave antenna field.

An architecture used in the AiP technology is as follows: An antenna radiating patch is integrated on a multi-layer substrate to form an antenna packaged substrate, and a radio frequency integrated circuit (RFIC) is integrated with the antenna packaged substrate to form a package, that is, a packaged antenna. The antenna packaged substrate generally includes two antenna radiating patches. The two antenna radiating patches are disposed on the multi-layer substrate in a stacked form, and a distance needs to be maintained between the two antenna radiating patches in a direction perpendicular to the multi-layer substrate by disposing a plurality of interlayer dielectric layers, to meet a performance requirement of a frequency band.

On the premise that a performance requirement of a frequency band is met, a distance between the two antenna radiating patches is relatively large. In other words, a total thickness of the plurality of interlayer dielectric layers between the two antenna radiating patches is relatively large. As a result, the antenna packaged substrate requires a more difficult processing process, and a quantity of interlayer dielectric layers increases, leading to a long processing process, a long cycle, and high costs.

SUMMARY

This application provides an antenna packaged substrate, a packaged antenna, a terminal, and a manufacturing method of an antenna packaged substrate, to reduce a distance between two layers of antenna radiating patches on the antenna packaged substrate and reduce a quantity of interlayer dielectric layers between the two layers of antenna radiating patches on the premise that a performance requirement of a frequency band is met.

To achieve the foregoing objective, the following technical solutions are used in this application.

A first aspect of this application provides an antenna packaged substrate. The antenna packaged substrate includes a substrate, a first antenna radiating patch disposed on a surface of the substrate, a second antenna radiating patch disposed over the first antenna radiating patch, and a dielectric stack disposed between the first antenna radiating patch and the second antenna radiating patch. The dielectric stack includes a first dielectric layer, a bonding layer disposed on a side that is of the first dielectric layer and faces the first antenna radiating patch, and a second dielectric layer disposed on a side that is of the first dielectric layer and faces the second antenna radiating patch. A dielectric constant of the first dielectric layer is lower than a dielectric constant of the substrate, so that an equivalent dielectric constant of the dielectric stack between the first antenna radiating patch and the second antenna radiating patch can be reduced, thereby reducing a distance between the first antenna radiating patch and the second antenna radiating patch. An expansion coefficient of the second dielectric layer is lower than an expansion coefficient of the first dielectric layer, to mitigate substrate warpage of the antenna packaged substrate caused by the relatively high expansion coefficient of the first dielectric layer.

In this way, according to the antenna packaged substrate, the dielectric stack including the first dielectric layer, the second dielectric layer, and the bonding layer is used, so that a material with a low dielectric constant is applied to the antenna packaged substrate, and a thickness of the dielectric stack between the first antenna radiating patch and the second antenna radiating patch is reduced, thereby reducing a total thickness of the entire antenna packaged substrate, and simplifying processing of the antenna packaged substrate. In addition, a quantity of dielectric layers included in the dielectric stack is also reduced, thereby shortening the processing process of the antenna packaged substrate, shortening a processing cycle of the antenna packaged substrate, and reducing costs of the antenna packaged substrate. Because the first dielectric layer in the dielectric stack uses a material with a relatively low dielectric constant, the equivalent dielectric constant of the dielectric stack is reduced, which helps improve a gain and a bandwidth of the antenna packaged substrate.

With reference to the first aspect, in an embodiment, a material of the first dielectric layer includes a polytetrafluoroethylene material. A dielectric constant value of the polytetrafluoroethylene material is about 2.17. The polytetrafluoroethylene material has a relatively low dielectric constant, which can reduce an overall equivalent dielectric constant of the dielectric stack.

In an embodiment, a material of the first dielectric layer further includes a filler added to the polytetrafluoroethylene material, and the filler is used to enhance rigidity of the first dielectric layer, to further mitigate the substrate warpage.

In an embodiment, the filler includes at least one of glass powder, ceramic powder, and glass fiber cloth.

With reference to the first aspect, in an embodiment, a value range of a proportion of a thickness of the first dielectric layer to a total thickness of the dielectric stack is 80% to 90%. In this way, the first dielectric layer is dominant in maintaining the distance between the first antenna radiating patch and the second antenna radiating patch, and reducing the equivalent dielectric constant of the dielectric stack.

With reference to the first aspect, in an embodiment, the second dielectric layer includes a resin sheet containing glass fiber cloth. With the resin sheet containing the glass fiber cloth, the expansion coefficient of the second dielectric layer can be reduced, and the second dielectric layer has a relatively good mechanical property, to effectively mitigate the substrate warpage.

In an embodiment, the expansion coefficient of the second dielectric layer ranges from 6 PPM to 10 PPM. In this way, an overall expansion coefficient of the dielectric stack can be reduced, to mitigate the substrate warpage.

In an embodiment, the bonding layer includes a resin sheet, to firmly bond the first dielectric layer in the dielectric stack to the substrate.

In an embodiment, a material of the substrate includes a resin material. The resin material has a relatively low expansion coefficient, which can maintain an equivalent expansion coefficient of the entire antenna packaged substrate at a relatively low level, so that the entire antenna packaged substrate can match a radio frequency integrated circuit and a circuit board well.

In an embodiment, a thickness of the substrate ranges from 220 μm to 280 μm. The substrate is set to a relatively large thickness to support overall rigidity of the entire antenna packaged substrate.

In an embodiment, the antenna packaged substrate further includes a plurality of copper sheets disposed on a side that is of the dielectric stack and faces away from the substrate, where the copper sheets are suspended or grounded, and the copper sheets are electrically insulated from a second antenna radiating layer. In this way, copper content on two sides of the substrate can be balanced by disposing the copper sheets, thereby mitigating the substrate warpage.

In an embodiment, the antenna packaged substrate further includes a functional stack disposed on a side that is of the substrate and is opposite to a side on which the first antenna radiating patch is located, and in a direction perpendicular to and gradually away from the substrate, the functional stack sequentially includes a ground shielding layer, a first insulation layer, a feeder layer, a second insulation layer, a signal output layer, and a third insulation layer.

The ground shielding layer is configured to shield electromagnetic interference, and form a ground plane reference for the first antenna radiating patch. The feeder layer is configured to couple energy to the first antenna radiating patch and the second antenna radiating patch. The signal output layer is configured to implement information exchange between a radio frequency integrated circuit and a circuit board. The first insulation layer, the second insulation layer, and the third insulation layer are configured to implement electrical insulation between conductive layers on two sides of the respective insulation layer.

In an embodiment, the functional stack further includes a first feeding structure and a second feeding structure. The first feeding structure is disposed between the first antenna radiating patch and the feeder layer. The first feeding structure penetrates the substrate and the first insulation layer. One end of the first feeding structure is electrically connected to the first antenna radiating patch, the other end is electrically connected to the feeder layer, and the first feeding structure is electrically insulated from the ground shielding layer. The second feeding structure is disposed on a side that is of the feeder layer and faces away from the substrate. The second feeding structure penetrates the second insulation layer and the third insulation layer. One end of the second feeding structure close to the feeder layer is electrically connected to the feeder layer, and the second feeding structure is electrically insulated from the signal output layer. The first feeding structure and the second feeding structure serve as a vertical transition of an antenna radio frequency signal, to reduce energy loss.

A second aspect of this application provides a packaged antenna. The packaged antenna includes a radio frequency integrated circuit, and further includes the antenna packaged substrate according to the first aspect, and the radio frequency integrated circuit is mounted on a side that is of the antenna packaged substrate and is opposite to a side on which the second antenna radiating patch is located. The radio frequency integrated circuit is configured to provide an antenna radio frequency signal to the antenna packaged substrate.

A third aspect of this application provides a terminal. The terminal includes a circuit board, and further includes the packaged antenna according to the second aspect that is mounted on the circuit board, and a side of the packaged antenna on which the radio frequency integrated circuit is mounted faces the circuit board. The terminal is configured to send and receive antenna signals.

A fourth aspect of this application provides a manufacturing method of an antenna packaged substrate. The manufacturing method includes: providing a substrate, and manufacturing a first antenna radiating patch on a surface of the substrate; forming a dielectric stack on the first antenna radiating patch, where in a direction perpendicular to and gradually away from the substrate, the dielectric stack sequentially includes an bonding layer, a first dielectric layer, and a second dielectric layer, a dielectric constant of the first dielectric layer is lower than a dielectric constant of the substrate, and an expansion coefficient of the second dielectric layer is lower than an expansion coefficient of the first dielectric layer; and manufacturing a second antenna radiating patch on a surface of the dielectric stack facing away from the substrate. The manufacturing method of an antenna packaged substrate can produce the same beneficial effects as the antenna packaged substrate provided in the first aspect of this application. Details are not described herein again.

DESCRIPTION OF EMBODIMENTS

Figure 1:
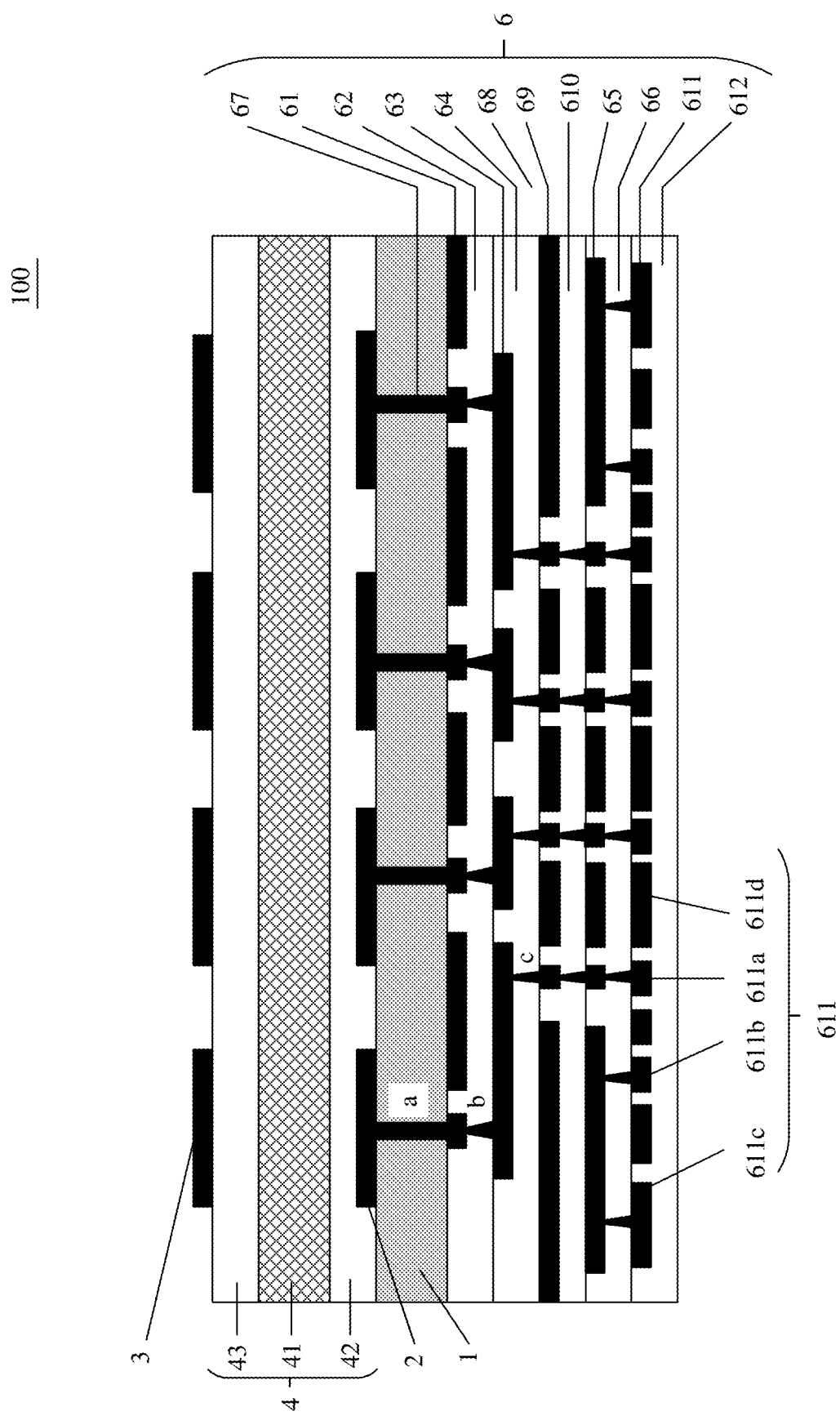
FIG. 1 is a sectional view of an antenna packaged substrate according to an embodiment of this application.

As described in the background, on the premise that a performance requirement of a frequency band is met, a distance between two antenna radiating patches is relatively large. As a result, an antenna packaged substrate has a more difficult processing process, and a quantity of interlayer dielectric layers between the two antenna radiating patches increases, leading to a long processing process, a long cycle, and high costs. This is because the distance between the two antenna radiating patches (that is, a total thickness of a plurality of interlayer dielectric layers between the two antenna radiating patches) is related to an antenna frequency band and a dielectric constant of a dielectric layer. A lower antenna frequency band indicates that the distance between the two antenna radiating patches may be larger. A higher antenna frequency band indicates that the distance between the two antenna radiating patches may be smaller. A lower dielectric constant value of the dielectric layer between the two antenna radiating patches indicates that the distance between the two antenna radiating patches may be smaller. A higher dielectric constant value of the dielectric layer between the two antenna radiating patches indicates that the distance needs to be larger.

When the antenna packaged substrate needs to meet a requirement of a relatively high antenna frequency band, the distance between the two antenna radiating patches needs to be set relatively large. However, based on the consideration of lightness and thinness of the antenna packaged substrate, a thickness of the antenna packaged substrate needs to be reduced as much as possible, which requires the distance between the two antenna radiating patches to be reduced as much as possible. Considering that the distance between the two antenna radiating patches is positively correlated with dielectric constant values of the plurality of interlayer dielectric layers between the two antenna radiating patches, a material with a relatively low dielectric constant is needed as an interlayer dielectric layer. However, existing interlayer dielectric layer materials all have relatively high dielectric constants, and cannot meet the requirement for a relatively low dielectric constant. As a result, the distance between the two antenna radiating patches cannot be reduced.

A relatively large distance between the two antenna radiating patches causes the following problems.

On one hand, on the premise that the quantity of interlayer dielectric layer between the two antenna radiating patches is fixed, the relatively large distance between the two antenna radiating patches causes a more difficult processing process. For example, to enhance isolation of the antenna packaged substrate in a direction perpendicular to a plane of the substrate, a blind via is usually made in the interlayer dielectric layer. However, because the distance between the two antenna radiating patches is relatively large, on the premise that the quantity of interlayer dielectric layers is fixed, a thickness of each interlayer dielectric layer is caused to be excessively large. As a result, processing of the blind via is difficult. In an embodiment, a process of filling copper in the blind via is more difficult. Especially for a frequency band below 40G, the thickness of each interlayer dielectric layer needs to be greater than 80 μm, and blind via processing is very difficult. For another example, the relatively large distance between the two antenna radiating patches causes a total substrate thickness of the entire antenna packaged substrate to be excessively large, which may even exceed an allowable substrate thickness capability of a common chip scale package (CSP) product line, resulting in processing difficulties.

On the other hand, due to a limitation of the blind via processing process, the thickness of each interlayer dielectric layer cannot be excessively large. Therefore, the relatively large distance between the two antenna radiating patches causes more interlayer dielectric layers between the two antenna radiating patches. For example, for an antenna packaged substrate on a 28G frequency band in which interlayer dielectric layers between two antenna radiating patches have a dielectric constant of 3.6, a distance between the two antenna radiating patches needs to be maintained at least 400 μm. However, a thickness of each interlayer dielectric layer cannot be excessively large, and is about 80 μm. As a result, a quantity of the interlayer dielectric layers between the two antenna radiating patches is required to be at least five. The quantity of the interlayer dielectric layers is relatively large, leading to a long processing process, a long cycle, and high costs of the antenna packaged substrate.

In addition, because dielectric constants of existing materials of the interlayer dielectric layer between the two antenna radiating patches are generally high, performance of the antenna packaged substrate is deteriorated. For example, a gain is low and a bandwidth is narrow.

Based on the foregoing status quo, embodiments of this application provide an antenna packaged substrate. An interlayer dielectric layer between two layers of antenna radiating patches in the antenna packaged substrate is made of a material with a low dielectric constant, so that a distance between the two layers of antenna radiating patches is reduced. Because the material with the low dielectric constant may have a relatively large expansion coefficient, an interlayer dielectric layer is made of a material with a low expansion coefficient, and is stacked between the interlayer dielectric layer made of the material with the low dielectric constant and an upper layer of antenna radiating patch (that is, a layer of antenna radiating patch in the two layers of antenna radiating patches that is close to the outside of the antenna packaged substrate), to limit expansion and contraction of the interlayer dielectric layer made of the material with the low dielectric constant, and reduce substrate warpage of the antenna packaged substrate. Because a bonding force between the material with the low dielectric constant and a material of a substrate (a substrate for supporting rigidity of the entire antenna packaged substrate) of the antenna packaged substrate may be poor, an interlayer dielectric layer is made of a material capable of bonding to both the material with the low dielectric constant and the material of the substrate, so that the interlayer dielectric layer made of the material with the low dielectric constant is firmly bonded to the substrate. Through the foregoing arrangement of the interlayer dielectric layers between the two layers of antenna radiating patches, the material with the low dielectric constant is applied to the antenna packaged substrate on the premise that substrate warpage is acceptable and bonding between layers of the substrate is reliable, so that the distance between the two layers of antenna radiating patches of the antenna packaged substrate is reduced, and a quantity of interlayer dielectric layers between the two layers of antenna radiating patches is reduced.

The foregoing provides some basic descriptions of the antenna packaged substrate provided in the embodiments of this application. Based on the foregoing basic descriptions, the following describes the antenna packaged substrate in the embodiments of this application in detail.

As shown in FIG. 1, an antenna packaged substrate 100 provided in an embodiment of this application includes: a substrate 1, a first antenna radiating patch 2, a second antenna radiating patch 3, and a dielectric stack 4. The first antenna radiating patch 2 is disposed on a surface of the substrate 1, the second antenna radiating patch 3 is disposed on a side that is of the first antenna radiating patch 2 and faces away from the substrate 1, and the dielectric stack 4 is disposed between the first antenna radiating patch 2 and the second antenna radiating patch 3.

The dielectric stack 4 includes a first dielectric layer 41, a bonding layer 42, and a second dielectric layer 43. The bonding layer 42 is disposed on a side that is of the first dielectric layer 41 and faces the first antenna radiating patch 2, and the second dielectric layer 43 is disposed on a side that is of the first dielectric layer 41 and faces the second antenna radiating patch 3.

The first dielectric layer 41 is disposed between the first antenna radiating patch 2 and the second antenna radiating patch 3, so that a distance can be formed between the first antenna radiating patch 2 and the second antenna radiating patch 3, and an antenna can meet a performance requirement of a frequency band.

In addition, a dielectric constant of the first dielectric layer 41 is lower than a dielectric constant of the substrate 1. This indicates that the dielectric constant of the first dielectric layer 41 is relatively low. Therefore, an equivalent dielectric constant of the dielectric stack 4 between the first antenna radiating patch 2 and the second antenna radiating patch 3 can be reduced, so that the distance between the first antenna radiating patch 2 and the second antenna radiating patch 3 is reduced, thereby helping reduce a total substrate thickness of the antenna packaged substrate 100 and reduce difficulty of a substrate processing process, and improving antenna performance, for example, improving a gain and a bandwidth.

An expansion coefficient of the second dielectric layer 43 is lower than an expansion coefficient of the first dielectric layer 41. The expansion coefficient of the second dielectric layer 43 is relatively small, to mitigate substrate warpage of the antenna packaged substrate 100.

A material with a relatively low dielectric constant may be accompanied by a relatively high expansion coefficient. If an expansion coefficient of a material of the first dielectric layer 41 is relatively large, when the dielectric stack 4 is press-fitted, the first dielectric layer 41 is deformed by heat, causing the antenna packaged substrate 100 to be warped. The second dielectric layer 43 is disposed and the expansion coefficient of the second dielectric layer 43 is lower than the expansion coefficient of the first dielectric layer 41. In other words, the expansion coefficient of the second dielectric layer 43 is relatively small. In this way, in combination with the second dielectric layer 43 and the first dielectric layer 41, on the premise of reducing the distance between the first antenna radiating patch 2 and the second antenna radiating patch 3, an overall expansion coefficient of the dielectric stack 4 can be effectively reduced, to limit expansion and contraction of the first dielectric layer 41, thereby effectively mitigating the substrate warpage of the antenna packaged substrate 100.

The bonding layer 42 in the dielectric stack 4 can improve a capability of bonding between the first dielectric layer 41 and the substrate 1, and is configured to bond the first dielectric layer 41 to the substrate 1. In addition, the bonding layer 42 is bonded to the first antenna radiating patch 2.

It should be noted that, by using the foregoing embodiment, in the dielectric stack 4, because the first dielectric layer 41 has a relatively low dielectric constant, an overall equivalent dielectric constant of the dielectric stack 4 is also relatively low. The equivalent dielectric constant is related to a proportion of a thickness of the first dielectric layer 41 to a total thickness of the dielectric stack 4. A higher proportion of the thickness of the first dielectric layer 41 to the total thickness of the dielectric stack 4 indicates a lower equivalent dielectric constant. However, a material with a low dielectric constant may be accompanied by a relatively large expansion coefficient. If the proportion of the thickness of the first dielectric layer 41 to the total thickness of the dielectric stack 4 is excessively high, the substrate warpage of the antenna packaged substrate 100 may be greatly affected. Therefore, in an embodiment, the foregoing two factors need to be comprehensively considered based on an actual requirement. If more attention is paid to reducing a thickness of the antenna packaged substrate 100, the proportion of the thickness of the first dielectric layer 41 to the total thickness of the dielectric stack 4 may be appropriately increased. If more attention is paid to flatness of the antenna packaged substrate 100, the proportion of the thickness of the first dielectric layer 41 to the total thickness of the dielectric stack 4 may be appropriately decreased. For example, a value range of the proportion of the thickness of the first dielectric layer 41 to the total thickness of the dielectric stack 4 is 80% to 90%. In this way, the equivalent dielectric constant of the dielectric stack 4 can be effectively reduced, to reduce the total thickness of the dielectric stack 4. In addition, it can be ensured that the antenna packaged substrate 100 is warped within an acceptable range.

In conclusion, according to the antenna packaged substrate 100 provided in the embodiments of this application, the dielectric stack 4 including the first dielectric layer 41, the bonding layer 42, and the second dielectric layer 43 is used, so that a material with a low dielectric constant is applied to the antenna packaged substrate, and the thickness of the dielectric stack 4 between the first antenna radiating patch 2 and the second antenna radiating patch 3 is reduced, thereby reducing a total thickness of the entire antenna packaged substrate 100, and reducing difficulty of the processing process of the antenna packaged substrate 100.

Because the dielectric stack 4 between the first antenna radiating patch 2 and the second antenna radiating patch 3 includes only three dielectric layers: the second dielectric layer 43, the first dielectric layer 41, and the bonding layer 42, a quantity of dielectric layers included in the dielectric stack 4 is also reduced, so that a total quantity of layers of the entire antenna packaged substrate 100 is reduced, thereby shortening the processing process of the antenna packaged substrate 100, shortening a processing cycle of the antenna packaged substrate 100, and reducing costs of the antenna packaged substrate 100.

In addition, because the first dielectric layer 41 in the dielectric stack 4 between the first antenna radiating patch 2 and the second antenna radiating patch 3 uses a material with a relatively low dielectric constant, the equivalent dielectric constant of the dielectric stack 4 is reduced, which helps improve a gain and a bandwidth of the antenna packaged substrate 100. Further, because the equivalent dielectric constant of the dielectric stack 4 is reduced, an isolation requirement of the antenna packaged substrate 100 in a direction perpendicular to a plane of the substrate can be met without a blind via made in the dielectric stack 4, which helps reduce the difficulty of the processing process of the antenna packaged substrate 100, and shorten the processing process.

In an embodiment, the dielectric constant of the first dielectric layer 41 is 2.10 to 2.30. The dielectric constant has a relatively low value, so that the equivalent dielectric constant of the dielectric stack 4 can be effectively reduced.

In some embodiments, the material of the first dielectric layer 41 may include a polytetrafluoroethylene (PTFE) material. A dielectric constant value of the polytetrafluoroethylene material is about 2.17, and it may be considered that the polytetrafluoroethylene material has a relatively low dielectric constant. Therefore, the polytetrafluoroethylene material may be used as the material of the first dielectric layer 41 to reduce the overall equivalent dielectric constant of the dielectric stack 4, to reduce the thickness of the dielectric stack 4 between the first antenna radiating patch 2 and the second antenna radiating patch 3.

For example, an antenna packaged substrate 100 on a 28 G frequency band is used as an example. If an interlayer dielectric layer between a first antenna radiating patch 2 and a second antenna radiating patch 3 uses a material with a dielectric constant of 3.6, a distance between the first antenna radiating patch 2 and the second antenna radiating patch 3 needs to be maintained at least 400 μm. If the dielectric stack 4 in the embodiments of this application is used between the first antenna radiating patch 2 and the second antenna radiating patch 3, and the material of the first dielectric layer 41 in the dielectric stack 4 is the polytetrafluoroethylene material, the distance between the first antenna radiating patch 2 and the second antenna radiating patch 3 may be reduced to about 250 μm. It can be learned from above that, by using the technical solutions provided in the embodiments of this application, the distance between the first antenna radiating patch 2 and the second antenna radiating patch 3 is greatly reduced, thereby reducing the difficulty of the processing process of the antenna packaged substrate 100.

The antenna packaged substrate 100 on the 28 G frequency band is still used as an example. If interlayer dielectric layers between the first antenna radiating patch 2 and the second antenna radiating patch 3 use the material with the dielectric constant of 3.6, the distance between the first antenna radiating patch 2 and the second antenna radiating patch 3 needs to be maintained at least 400 μm, and a thickness of each interlayer dielectric layer needs to be about 80 μm, a quantity of the interlayer dielectric layers needs to be at least five. If the dielectric stack 4 in the embodiments of this application is used between the first antenna radiating patch 2 and the second antenna radiating patch 3, and the material of the first dielectric layer 41 in the dielectric stack 4 is the polytetrafluoroethylene material, the distance between the first antenna radiating patch 2 and the second antenna radiating patch 3 may be reduced to about 250 μm, and a quantity of layers of the dielectric stack 4 may be reduced to 3, including only the second dielectric layer 43, the first dielectric layer 41, and the bonding layer 42, thereby shortening the processing process of the antenna packaged substrate 100.

Further, a filler may be added to the first dielectric layer 41 including the polytetrafluoroethylene material, to enhance rigidity of the first dielectric layer 41, to further mitigate the substrate warpage. For example, the filler added to the polytetrafluoroethylene material may include at least one of glass powder, ceramic powder, and glass fiber cloth.

In some embodiments, the second dielectric layer 43 includes a resin sheet containing glass fiber cloth. The resin sheet has a low expansion coefficient. The glass fiber cloth has relatively strong tensile performance and coverage, and is usually used as a reinforcing material in a composite material. A mechanical property of the resin sheet can be improved by adding the glass fiber cloth into the resin sheet. With the resin sheet containing the glass fiber cloth, the expansion coefficient of the second dielectric layer 43 can be reduced, and the second dielectric layer 43 has a relatively good mechanical property, so that expansion and contraction of the first dielectric layer 41 can be limited, to effectively mitigate the substrate warpage.

In an embodiment, the expansion coefficient of the second dielectric layer 43 may be adjusted by adjusting a material type, a content proportion, or the like of the second dielectric layer 43. For example, a type of a resin material in the second dielectric layer 43 is changed, or a proportion of the glass fiber cloth included in the resin sheet is adjusted, so that the overall expansion coefficient of the dielectric stack 4 is reduced, to mitigate the substrate warpage. For example, the expansion coefficient of the second dielectric layer 43 may range from 6 PPM to 10 PPM.

In an embodiment, the bonding layer 42 includes a resin sheet. The resin sheet is a material in a state in which a polymer crosslinking reaction is not completed. Therefore, when the dielectric stack 4 is disposed on the substrate 1, and press-fitted by using a lamination process, the resin sheet undergoes a crosslinking reaction, and produces high viscosity, so that the first dielectric layer 41 in the dielectric stack 4 may be firmly bonded to the substrate 1, and the first dielectric layer 41 in the dielectric stack 4 may be bonded to the first antenna radiating patch 2.

In an embodiment, the thickness of the first dielectric layer 41 in the dielectric stack 4 is greater than a thickness of the second dielectric layer 43, and is also greater than a thickness of the bonding layer 42, so that the first dielectric layer 41 is dominant in maintaining the distance between the first antenna radiating patch 2 and the second antenna radiating patch 3, and reducing the equivalent dielectric constant of the dielectric stack 4. For example, the proportion of the thickness of the first dielectric layer 41 to the total thickness of the dielectric stack 4 ranges from 80% to 90%, a proportion of the thickness of the second dielectric layer 43 to the total thickness of the dielectric stack 4 ranges from 5% to 10%, and a proportion of the thickness of the bonding layer 42 to the total thickness of the dielectric stack 4 ranges from 5% to 10%. Further, for the antenna packaged substrate 100 on the 28 G frequency band, the material of the first dielectric layer 41 in the dielectric stack 4 is the polytetrafluoroethylene material, the second dielectric layer 43 includes a resin sheet containing glass fiber cloth, and the bonding layer 42 includes a resin sheet. The total thickness of the dielectric stack 4 is 250 μm. The thickness of the first dielectric layer 41 ranges from 200 μm to 225 μm, the thickness of the second dielectric layer 43 ranges from 12.5 μm to 25 μm, and the thickness of the bonding layer 42 ranges from 12.5 μm to 25 μm.

Figure 4:
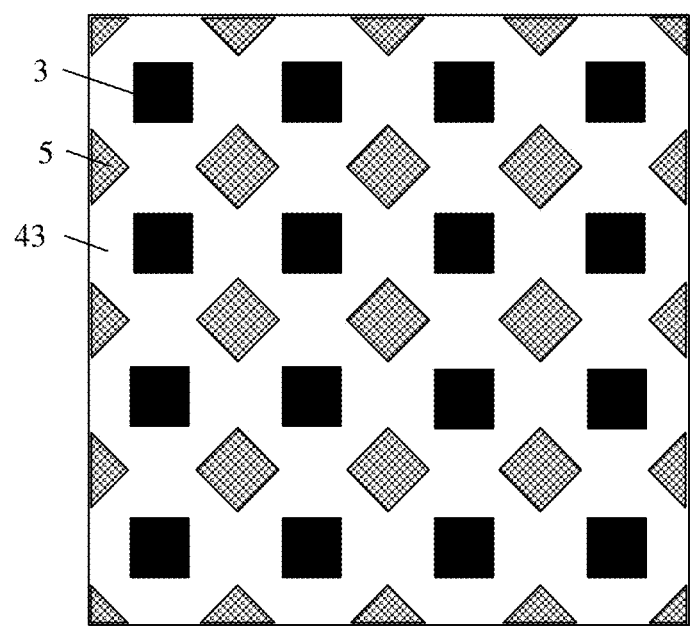
FIG. 4 is a top view of an antenna packaged substrate according to an embodiment of this application.

In the antenna packaged substrate 100, both a quantity of first antenna radiating patches 2 and a quantity of second antenna radiating patches 3 may be 1. Alternatively, as shown in FIG. 1 and FIG. 4, there may be a plurality of second antenna radiating patches 3, and the plurality of second antenna radiating patches 3 are arranged in an array. Correspondingly, there are also a plurality of first antenna radiating patches 2, which are also arranged in an array. In addition, the plurality of first antenna radiating patches 2 and the plurality of second antenna radiating patches 3 are disposed in a one-to-one correspondence. In this way, two or more single antennas operating at a same frequency are spatially arranged based on different parameters such as an antenna feeding current, a spacing, and an electrical length, to form an antenna array, so that a relatively high antenna gain can be obtained and antenna radiation directivity can be improved. In addition, directional performance of radiation can be adjusted as needed.

In an embodiment, referring to FIG. 4 again, the antenna packaged substrate 100 further includes a plurality of copper sheets 5 disposed on a side that is of the dielectric stack 4 and faces away from the substrate 1, the copper sheets 5 are suspended or grounded, and the copper sheets 5 are electrically insulated from the second antenna radiating patch 3.

In the antenna packaged substrate 100, a multi-layer structure is disposed on a side that is of the substrate 1 and faces away from the first antenna radiating patch 2. The multi-layer structure is composed of a plurality of materials, and copper is an important component. Therefore, even copper distribution is important in mitigating overall substrate warpage of the antenna packaged substrate 100. Because the dielectric stack 4 is disposed on the side of the substrate 1 on which the first antenna radiating patch 2 is disposed in the antenna packaged substrate 100, overall copper content of the structure on this side is less than copper content of the multi-layer structure on the side that is of the substrate 1 and faces away from the first antenna radiating patch 2. As a result, overall copper content on the two sides of the substrate 1 is unevenly distributed. Therefore, the plurality of copper sheets 5 are added on the side that is of the dielectric stack 4 and faces away from the substrate 1, to increase the overall copper content on the side of the substrate 1 on which the first antenna radiating patch 2 is disposed, so that the copper content on the two sides of the substrate 1 is balanced, thereby mitigating the substrate warpage.

The copper sheets 5 may be directly disposed on a surface of the dielectric stack 4 facing away from the substrate 1 through soldering. Alternatively, the entire surface of the dielectric stack 4 facing away from the substrate 1 may be covered by a copper sheet, and then the entire copper sheet is etched based on a designed pattern of the copper sheets 5, to remove unnecessary parts and form the plurality of copper sheets 5.

As shown in FIG. 4, for an arrangement form of the plurality of second antenna radiating patches 3 and the plurality of copper sheets 5 arranged in an array, refer to a form shown in the figure. In an embodiment, both the plurality of second antenna radiating patches 3 and the plurality of copper sheets 5 are arranged in an array and evenly distributed, and both the copper sheets 5 and the second antenna radiating patches 3 are disposed at intervals for electrical insulation.

In an embodiment, a material of the substrate 1 includes a resin material. The resin material has a relatively low expansion coefficient, which can maintain an equivalent expansion coefficient of the entire antenna packaged substrate 100 at a relatively low level, so that the entire antenna packaged substrate 100 can match a radio frequency integrated circuit and a circuit board well. The equivalent expansion coefficient of the antenna packaged substrate 100 may range between expansion coefficients of the radio frequency integrated circuit and the circuit board. For example, generally, the expansion coefficient of the radio frequency integrated circuit ranges from 3 PPM to 4 PPM, the expansion coefficient of the circuit board ranges from 16 PPM to 18 PPM, and the equivalent expansion coefficient of the antenna packaged substrate 100 may range from 10 PPM to 13 PPM. In this way, when the radio frequency integrated circuit and the antenna packaged substrate 100 are integrated, the two are soldered by using a solder bump. Because the equivalent expansion coefficient of the entire antenna packaged substrate 100 matches the expansion coefficient of the radio frequency integrated circuit well, the solder bump can be prevented from cracking. When the circuit board and the antenna packaged substrate 100 are integrated, the two are soldered by using a solder ball. Because the equivalent expansion coefficient of the entire antenna packaged substrate 100 matches the expansion coefficient of the circuit board relatively well, the solder ball can be prevented from cracking.

In an embodiment, the material of the substrate 1 includes a CCL (Copper-clad Laminate, copper-clad laminate). The CCL also has a relatively low expansion coefficient, which can maintain the equivalent expansion coefficient of the entire antenna packaged substrate 100 at a relatively low level, so that the entire antenna packaged substrate 100 can match a radio frequency integrated circuit and a circuit board well.

In an embodiment, to support overall rigidity of the entire antenna packaged substrate 100, the substrate 1 needs to have a relatively large thickness. For example, the thickness of the substrate 1 ranges from 220 μm to 280 μm.

In an embodiment, the antenna packaged substrate 100 further includes a functional stack 6 disposed on a side that is of the substrate 1 and is opposite to the side on which the first antenna radiating patch 2 is located, and in a direction perpendicular to and gradually away from the substrate 1, the functional stack 6 sequentially includes a ground shielding layer 61, a first insulation layer 62, a feeder layer 63, a second insulation layer 64, a signal output layer 65, and a third insulation layer 66.

The ground shielding layer 61 is disposed on the side that is of the substrate 1 and faces away from the first antenna radiating patch 2. The ground shielding layer 61 may isolate the substrate 1, the first antenna radiating patch 2, the second antenna radiating patch 3, and the dielectric stack 4 from each layer of structure on a side that is of the ground shielding layer 61 and faces away from the substrate 1, to shield interference of each layer of structure on the side that is of the ground shielding layer 61 and faces away from the substrate 1 to the first antenna radiating patch 2 and the second antenna radiating patch 3, and may form a ground plane reference for the first antenna radiating patch 2, so that the first antenna radiating patch 2 and the second antenna radiating patch 3 form an electromagnetic field and radiate an electromagnetic wave.

The first insulation layer 62 is disposed on the side that is of the ground shielding layer 61 and faces away from the substrate 1. The first insulation layer 62 is configured to electrically insulate the ground shielding layer 61 from the feeder layer 63.

The feeder layer 63 is disposed on a side that is of the first insulation layer 62 and faces away from the substrate 1. The feeder layer 63 is configured to transmit, to the first antenna radiating patch 2 and the second antenna radiating patch 3 as energy, an antenna radio frequency signal sent by a radio frequency integrated circuit, or transmit, to the radio frequency integrated circuit 7, energy obtained by converting radio waves received by the first antenna radiating patch 2 and the second antenna radiating patch 3, to implement sending and receiving of antenna signals.

The second insulation layer 64 is disposed on a side that is of the feeder layer 63 and faces away from the substrate 1, and is configured to electrically insulate the feeder layer 63 from the signal output layer 65.

The signal output layer 65 is disposed on a side that is of the second insulation layer 64 and faces away from the substrate 1, and is configured to implement information exchange between the radio frequency integrated circuit and the circuit board, for example, transmit power and control signals.

The third insulation layer 66 is disposed on a side that is of the signal output layer 65 and faces away from the substrate 1, and is configured to electrically insulate the signal output layer 65 from a circuit disposed on a side that is of the third insulation layer 66 and faces away from the substrate 1.

In an embodiment, the functional stack 6 may further include a first feeding structure 67 and a second feeding structure 68. The first feeding structure 67 is disposed between the first antenna radiating patch 2 and the feeder layer 63, and penetrates the substrate 1 and the first insulation layer 62. One end of the first feeding structure 67 is electrically connected to the first antenna radiating patch 2, the other end is electrically connected to the feeder layer 63, and the first feeding structure 67 is electrically insulated from the ground shielding layer 61. The first feeding structure 67 serves as a vertical transition of an antenna radio frequency signal, and can more effectively transmit energy transmitted by the radio frequency integrated circuit to the feeder layer 63 to the second antenna radiating patch 3, to reduce energy loss.

The second feeding structure 68 is disposed on the side that is of the feeder layer 63 and faces away from the substrate 1, and penetrates the second insulation layer 64 and the third insulation layer 66. One end of the second feeding structure 68 close to the feeder layer 63 is electrically connected to the feeder layer 63, and the second feeding structure 68 is electrically insulated from the signal output layer 65. The second feeding structure 68 serves as a vertical transition of an antenna radio frequency signal, and can more effectively transmit, to the feeder layer 63, energy output by the radio frequency integrated circuit, to reduce energy loss.

In an embodiment, the functional stack 6 further includes a second ground shielding layer 69 and a fourth insulation layer 610 that are disposed between the second insulation layer 64 and the signal output layer 65. The second ground shielding layer 69 is located on the side that is of the second insulation layer 64 and faces away from the substrate 1. The fourth insulation layer 610 is located on a side that is of the second ground shielding layer 69 and faces away from the substrate 1. The second ground shielding layer 69 may be used as a ground plane of the feeder layer 63 to form a ground plane reference for the feeder layer 63. The fourth insulation layer 610 is configured to electrically insulate the second ground shielding layer 69 from the signal output layer 65. In addition, the second feeding structure 68 further penetrates the fourth insulation layer 610.

In an embodiment, the functional stack 6 further includes a connection layer 611 and a protective layer 612 that are sequentially disposed on the side that is of the third insulation layer 66 and faces away from the substrate 1. The connection layer 611 includes a first metal pad 611a, a second metal pad 611b, a third metal pad 611c, and a ground shield electrode 611d, and the first metal pad 611a, the second metal pad 611b, the third metal pad 611c, and the ground shielding electrode 611d are electrically insulated from each other.

In a subsequent process of integrating the antenna packaged substrate 100 with the radio frequency integrated circuit, a solder bump is needed to electrically connect the feeder layer 63 of the antenna packaged substrate 100 to the radio frequency integrated circuit by using the second feeding structure 68. The first metal pad 611a is used as a connecting component of the antenna packaged substrate 100, one surface of the first metal pad 611a is electrically connected to the second feeding structure 68, and the other surface is electrically connected to the solder bump, to implement electrical connection between the feeder layer 63 and the radio frequency integrated circuit. In addition, a solder bump is needed to electrically connect the signal output layer 65 of the antenna packaged substrate 100 to the radio frequency integrated circuit. The second metal pad 611b is used as a connecting component of the antenna packaged substrate 100, one surface of the second metal pad 611b is electrically connected to the signal output layer 65, and the other surface is connected to the solder bump, to implement electrical connection between the signal output layer 65 and the radio frequency integrated circuit.

In a process of integrating a packaged antenna formed by the antenna packaged substrate 100 and the radio frequency integrated circuit onto a circuit board, a solder ball is needed to electrically connect the signal output layer 65 of the antenna packaged substrate 100 to the circuit board. The third metal pad 611c is used as a connecting component of the antenna packaged substrate 100, one surface of the third metal pad 611c is electrically connected to the signal output layer 65, and the other surface is electrically connected to the solder ball, to implement electrical connection between the signal output layer 65 and the circuit board.

The ground shield electrode 611c may be used as a ground plane of the antenna packaged substrate 100.

The protective layer 612 covers the connection layer 611, and is configured to protect each conductive layer in the antenna packaged substrate 100.

Figure 2:
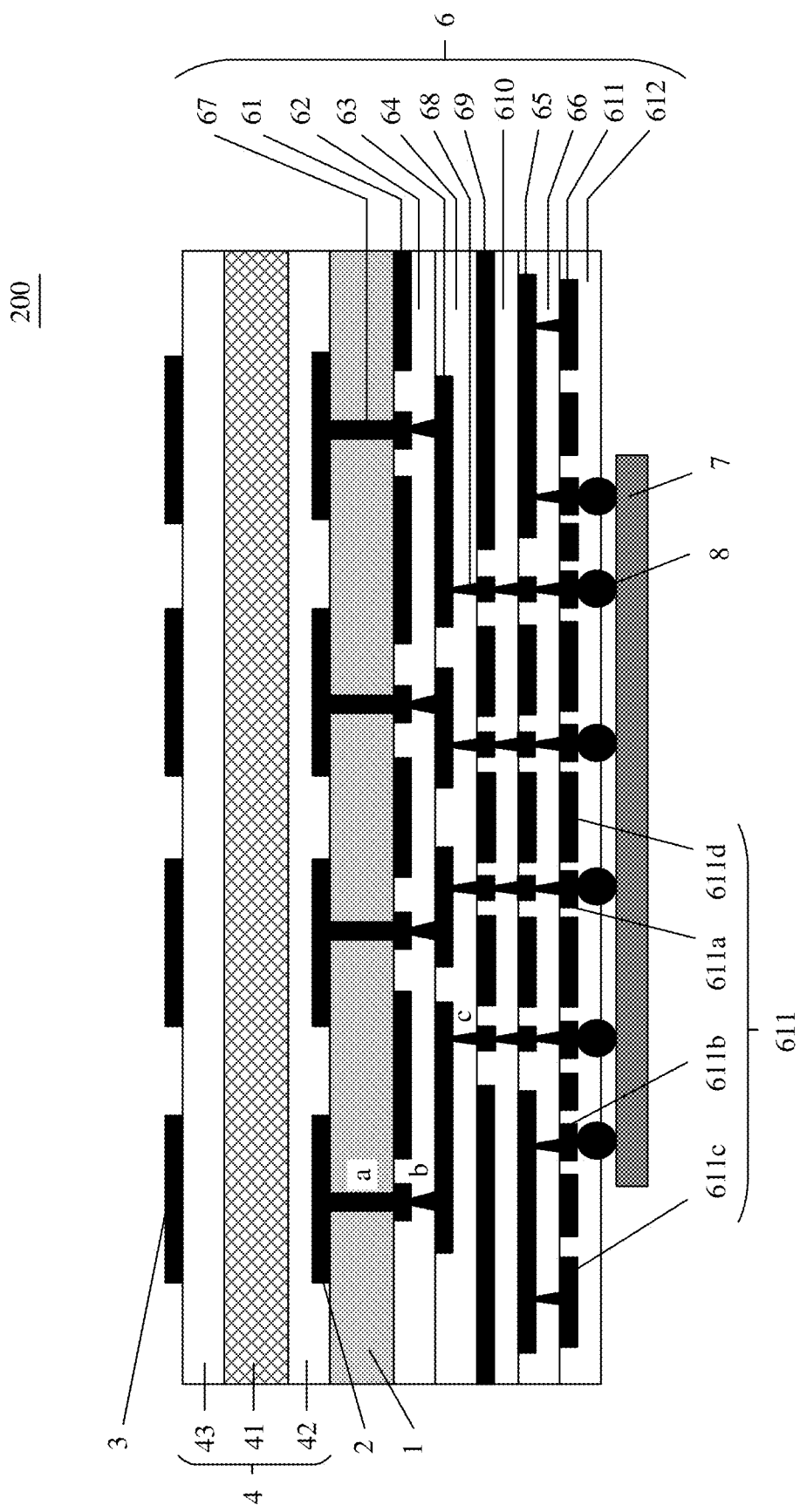
FIG. 2 is a sectional view of a packaged antenna according to an embodiment of this application.

The foregoing describes the antenna packaged substrate 100 provided in the embodiments of this application. Based on the antenna packaged substrate 100, some other embodiments of this application provide a packaged antenna 200. As shown in FIG. 2, the packaged antenna 200 includes a radio frequency integrated circuit 7 and the antenna packaged substrate 100. The radio frequency integrated circuit 7 is mounted on a side that is of the antenna packaged substrate 100 and is opposite to a side on which the second antenna radiating patch 3 is located. The radio frequency integrated circuit 7 is configured to provide an antenna radio frequency signal to the antenna packaged substrate 100. The radio frequency integrated circuit 7 is electrically connected to the antenna packaged substrate 100 by using a solder bump 8. For example, the solder bump 8 may be a tin solder bump.

Figure 3:
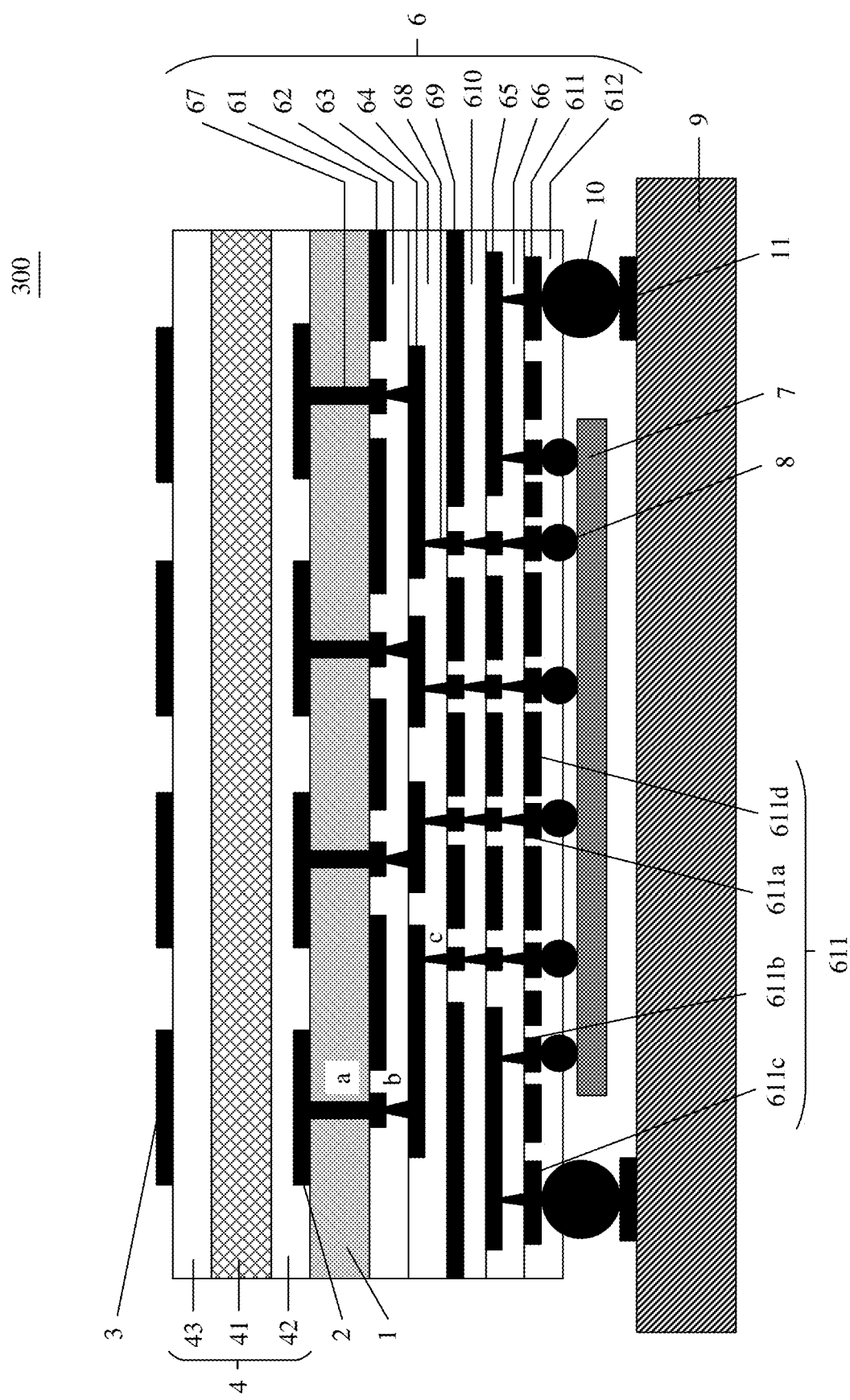
FIG. 3 is a sectional view of a packaged antenna integrated on a circuit board in a terminal according to an embodiment of this application.

Still other embodiments of this application provide a terminal 300. As shown in FIG. 3, the terminal 300 includes a circuit board 9, and further includes the packaged antenna 200 mounted on the circuit board 9. A side of the packaged antenna 200 on which the radio frequency integrated circuit 7 is mounted faces the circuit board 9. For example, the circuit board 9 may be a surface mount technology (SMT) motherboard or a printed circuit board (PCB). The circuit board 9 is electrically connected to the packaged antenna 200 by using a solder ball 10. For example, the solder ball 10 may be a tin solder ball.

The terminal 300 may be any terminal that implements a signal receiving and sending requirement by using an antenna, such as a mobile phone, a wearable device, a gesture radar, an in-vehicle radar, or an augmented reality (AR)\Virtual Reality (VR) device. This is not limited in the embodiments of this application.

In the terminal 300 provided in the embodiments of this application, a working principle of signal sending by the antenna is as follows: The circuit board 9 is electrically connected to the packaged antenna 200, and the signal output layer 65 implements information exchange between the radio frequency integrated circuit 7 and the circuit board 9, to provide a connection of a power, control, or baseband signal between the radio frequency integrated circuit 7 and the circuit board 9. The radio frequency integrated circuit 7 outputs an antenna radio frequency signal. The antenna radio frequency signal is transmitted as energy to the feeder layer 63 through the second feeding structure 68. The feeder layer 63 transmits the energy to the first antenna radiating patch 2 and the second antenna radiating patch 3 by using the first feeding structure 67. The first antenna radiating patch 2 and the second antenna radiating patch 3 convert the received energy into a radio wave propagating in an unbounded medium (usually a free space), and radiate the radio wave to a surrounding space. In this way, the signal is sent.

A working principle of signal receiving by the antenna is as follows: The first antenna radiating patch 2 and the second antenna radiating patch 3 receive a radio wave in space, and convert the radio wave into energy. The energy is transmitted to the radio frequency integrated circuit 7 sequentially through the first feeding structure 67, the feeder layer 63, and the second feeding structure 68, and the radio frequency integrated circuit 7 processes the received energy. In this way, the signal is received. The signal output layer 65 is also configured to implement information exchange between the radio frequency integrated circuit 7 and the circuit board 9, to provide a connection of a power, control, or baseband signal between the radio frequency integrated circuit 7 and the circuit board 9.

Yet other embodiments of this application provide a manufacturing method of an antenna packaged substrate. As shown in FIG. 5A to FIG. 5D, the manufacturing method includes the following operations.

Figure 5A:
FIGS. 5A-5D are diagrams of manufacturing operations of an antenna packaged substrate according to an embodiment of this application.

S1: Provide a substrate 1, and manufacture a first antenna radiating patch 2 on a surface of the substrate 1, as shown in FIG. 5A.

In the foregoing operation, a material of the substrate 1 may be a resin material or a CCL substrate. Both the resin material and the CCL substrate have a relatively low expansion coefficient, which can maintain an equivalent expansion coefficient of the entire antenna packaged substrate 100 at a relatively low level. A thickness of the substrate 1 ranges from 220 μm to 280 μm, which can support overall rigidity of the entire antenna packaged substrate 100. There may be one or more first antenna radiating patches 2. When there are a plurality of first antenna radiating patches 2, the plurality of first antenna radiating patches 2 may be arranged in an array. During manufacturing, a plurality of copper foils may be directly soldered onto the substrate 1 based on a designed array arrangement pattern to form the plurality of first antenna radiating patches 2. Alternatively, the entire surface of the substrate 1 may be covered by a copper sheet, and then the copper sheet is etched based on a designed array arrangement pattern to remove unnecessary parts, to form the plurality of first antenna radiating patches 2.

Figure 5B:
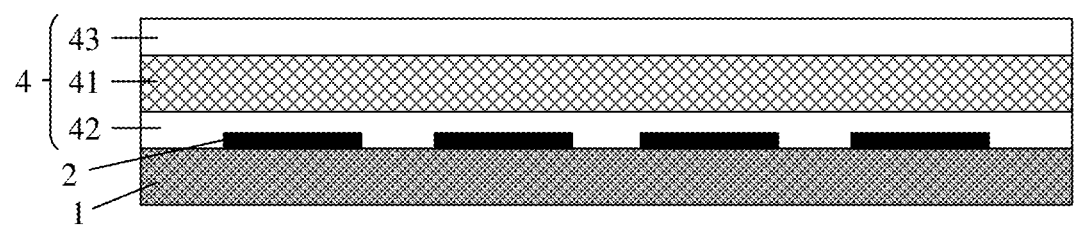

S2: Form a dielectric stack 4 on the first antenna radiating patch 2, as shown in FIG. 5B. In a direction perpendicular to and gradually away from the substrate 1, the dielectric stack 4 sequentially includes a bonding layer 43, a first dielectric layer 41, and a second dielectric layer 42.

A dielectric constant of the first dielectric layer 41 is lower than a dielectric constant of the substrate 1, to reduce an equivalent dielectric constant value of the dielectric stack 4, and reduce a distance between the first antenna radiating patch 2 and a second antenna radiating patch 3. An expansion coefficient of the second dielectric layer 42 is lower than an expansion coefficient of the first dielectric layer 41, to limit expansion and contraction of the first dielectric layer 41, and mitigate substrate warpage of the antenna packaged substrate 100.

For example, the bonding layer 43 and the first dielectric layer 41 in the dielectric stack 4 are sequentially stacked on the substrate 1, and press-fitted by using a prepreg lamination process, so that the bonding layer 43 undergoes a crosslinking reaction, and produces relatively high viscosity, to firmly bond the first dielectric layer 41 to the substrate 1, and bond the first dielectric layer 41 to the first antenna radiating patch 2. Next, the second dielectric layer 42 is pressed onto the first dielectric layer 41. Alternatively, the bonding layer 43, the first dielectric layer 41, and the second dielectric layer 42 may be sequentially stacked on the substrate 1, and press-fitted at a time by using a lamination process, so that the dielectric stack 4 including the bonding layer 43, the first dielectric layer 41, and the second dielectric layer 42 is bonded to the substrate 1.

Figure 5C:
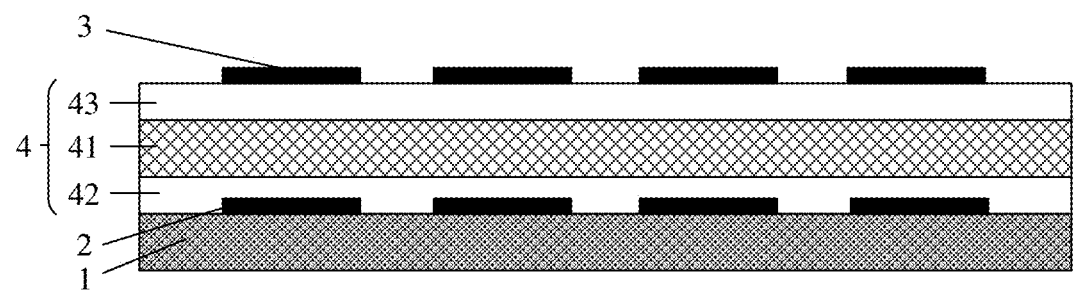

S3: Manufacture a second antenna radiating patch 3 on a surface of the dielectric stack 4 facing away from the substrate 1, as shown in FIG. 5C.

In the foregoing operation, there may be a plurality of second antenna radiating patches 3, and the plurality of second antenna radiating patches 3 may be arranged in an array. During manufacturing, copper foils may be directly soldered onto dielectric stack 4 based on an array arrangement pattern to form the plurality of second antenna radiating patches 3. Alternatively, the entire surface of the dielectric stack 4 facing away from the substrate 1 may be covered by a copper sheet, and then the copper sheet is etched based on an array arrangement pattern to form the plurality of second antenna radiating patches 3. In addition, the plurality of second antenna radiating patches 3 arranged in an array need to be in a one-to-one correspondence with the plurality of first antenna radiating patches 2 arranged in an array.

Figure 5D:
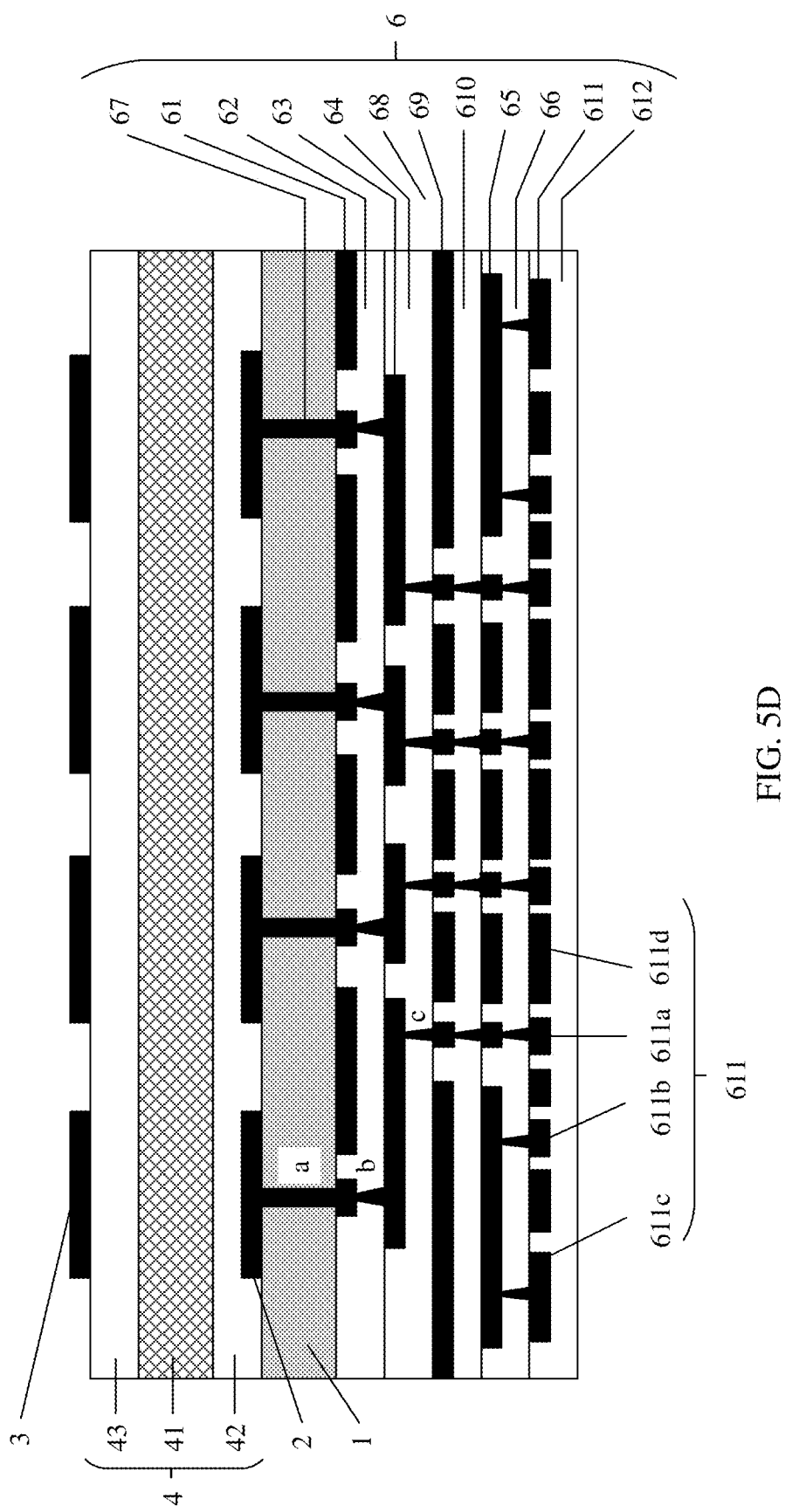

The manufacturing method of the antenna packaged substrate may further include the following operation:

S4. Manufacture a functional stack 6 on a side that is of the substrate 1 and is opposite to a side on which the first antenna radiating patch 2 is located, as shown in FIG. 5D.

For example, operation S4 includes the following procedure:

S41. Manufacture a ground shielding layer 61 on a side that is of the substrate 1 and faces away from the first antenna radiating patch 2.

The ground shielding layer 61 may be manufactured by using an Modified Semi-Additive Process (MSAP) or a semi-additive process (SAP). For example, a procedure of manufacturing the ground shielding layer 61 by using the MSAP process is as follows: The side that is of the substrate 1 and faces away from the first antenna radiating patch 2 is covered by a layer of ultra-thin copper foil. Laser drilling is performed on the substrate 1 at a position corresponding to the first antenna radiating patch 2 to form a through via a. The copper foil is covered by an etching resist film for exposure and development, a layer of copper foil is further electroplated onto a pattern formed after the development, and the through via a formed through the laser drilling on the substrate 1 is filled with copper. The etching resist film is removed, to rapidly etch the ultra-thin copper foil at a position covered by the etching resist film. Finally, a pattern of the copper foil remaining on the substrate 1 forms the ground shielding layer 61.

S42: Form a first insulation layer 62 on a side that is of the ground shielding layer 61 and faces away from the substrate 1.

For example, the first insulation layer 62 may be formed through chemical deposition.

S43. Form a feeder layer 63 on a side that is of the first insulation layer 62 and faces away from the substrate 1.

For example, the feeder layer 63 may be manufactured by using the MSAP process. An example procedure is as follows: The side that is of the first insulation layer 62 and faces away from the substrate 1 is covered by a layer of ultra-thin copper foil. Laser drilling is performed on the first insulation layer 62 at a position corresponding to the first antenna radiating patch 2, that is, at a position corresponding to the through via a formed on the substrate 1, to form a blind via b. The copper foil is covered by an etching resist film for exposure and development, a layer of copper foil is further electroplated onto a pattern formed after the development, and the blind via b formed through the laser drilling on the first insulation layer 62 is filled with copper. The etching resist film is removed, to rapidly etch the ultra-thin copper foil at a position covered by the etching resist film. Finally, a pattern of the copper foil remaining on the first insulation layer 62 forms the feeder layer 63.

A process of filling the through via a and the blind via b with copper is a hole metallization process, and the formed through via a and blind via b are connected in a one-to-one correspondence manner to form a first feeding structure 67. The first feeding structure 67 electrically connects the first antenna radiating patch 2 to the feeder layer 63.

S44: Form a second insulation layer 64 on a side that is of the feeder layer 63 and faces away from the substrate 1.

For example, the second insulation layer 64 may be formed through chemical deposition.

S45: Form a signal output layer 65 on a side that is of the second insulation layer 64 and faces away from the substrate 1.

For example, the signal output layer 65 may be manufactured by using the MSAP process. An example procedure is as follows: The side that is of the second insulation layer 64 and faces away from the substrate 1 is covered by a layer of ultra-thin copper foil. Laser drilling is performed on the second insulation layer 64 at a position corresponding to the feeder layer 63, to form a blind via c. The copper foil is covered by an etching resist film for exposure and development, a layer of copper foil is further electroplated onto a pattern formed after the development, and the blind via c formed through the laser drilling on the second insulation layer 64 is filled with copper. The etching resist film is removed, to rapidly etch the ultra-thin copper foil at a position covered by the etching resist film. Finally, a pattern of the copper foil remaining on the second insulation layer 64 forms the signal output layer 65. The copper filled in the blind via c forms a part of a second feeding structure 68.

S46: Form a third insulation layer 66 on a side that is of the signal output layer 65 and faces away from the substrate 1.

For example, the third insulation layer 66 may be formed through chemical deposition.

The manufacturing of the functional stack 6 by using the MSAP process can improve adhesion of a copper-clad surface, improve insulation between lines, improve reliability of through via connection, and simplify a process.

In an embodiment, the functional stack 6 further includes a second ground shielding layer 69 and a fourth insulation layer 610 that are disposed between the second insulation layer 64 and the signal output layer 65, and a connection layer 611 and a protective layer 612 that are sequentially disposed on a side that is of the third insulation layer 66 and faces away from the substrate 1. The second ground shielding layer 69 is located on the side that is of the second insulation layer 64 and faces away from the substrate 1. The fourth insulation layer 610 is located on a side that is of the second ground shielding layer 69 and faces away from the substrate 1. Correspondingly, between operations S44 and S45, the method further includes an operation of forming the second ground shielding layer 69 and the fourth insulation layer 610, and after operation S46, the method further includes an operation of forming the connection layer 611 and the protective layer 612. Similarly, the second ground shielding layer 69 and the connection layer 611 may be manufactured by using the MSAP process, and the fourth insulation layer 610 and the protective layer 612 may be manufactured through chemical deposition. Details are not described herein.

It should be noted that the manufacturing method of the antenna packaged substrate 100 is merely an example. In an embodiment of the antenna packaged substrate 100, depending on different materials of layers and different patterns of stacks of the antenna packaged substrate 100, the manufacturing method of the antenna packaged substrate 100 may have a plurality of different variations.

After the antenna packaged substrate 100 is manufactured, the antenna packaged substrate 100 is further integrated with the radio frequency integrated circuit 7 to form the packaged antenna 200. Referring to FIG. 2, the radio frequency integrated circuit 7 and the antenna packaged substrate 100 are electrically connected by using the solder bump 8.

The packaged antenna 200 further needs to be integrated on the circuit board 9 in the terminal 300. Referring to FIG. 3, for example, in a package method, a ball grid array (BGA) process may be used, to manufacture arrayed solder balls 10 at the bottom of the antenna packaged substrate 100 (that is, the side that is of the antenna packaged substrate 100 and is opposite to the side on which the second antenna radiating patch 3 is disposed), and the antenna packaged substrate 100 and pads 11 on a surface of the circuit board 9 are interconnected by using the solder balls 10.

In summary, what is described above are merely some embodiments of this application, but is not intended to limit the protection scope of this application. Any modification, equivalent replacement, or improvement made without departing from the spirit and principle of this application shall fall within the protection scope of this application.

What is claimed is:
1. An antenna packaged substrate, comprising:
   a substrate;
   a first antenna radiating patch disposed on a surface of the substrate;
   a second antenna radiating patch disposed over the first antenna radiating patch; and
   a dielectric stack disposed between the first antenna radiating patch and the second antenna radiating patch, wherein the dielectric stack comprises a first dielectric layer, a bonding layer disposed on a side of the first dielectric layer that faces the first antenna radiating patch, and a second dielectric layer disposed on a side of the first dielectric layer that faces the second antenna radiating patch, wherein
   a dielectric constant of the first dielectric layer is lower than a dielectric constant of the substrate, and an expansion coefficient of the second dielectric layer is lower than an expansion coefficient of the first dielectric layer.

2. The antenna packaged substrate according to claim 1, wherein a material of the first dielectric layer comprises a polytetrafluoroethylene material.

3. The antenna packaged substrate according to claim 2, wherein the material of the first dielectric layer further comprises a filler added to the polytetrafluoroethylene material, and the filler is used to enhance rigidity of the first dielectric layer.

4. The antenna packaged substrate according to claim 3, wherein the filler comprises at least one of glass powder, ceramic powder, or glass fiber cloth.

5. The antenna packaged substrate according to claim 1, wherein a value range of a proportion of a thickness of the first dielectric layer to a total thickness of the dielectric stack is 80% to 90%.

6. The antenna packaged substrate according to claim 1, wherein the second dielectric layer comprises a resin sheet containing glass fiber cloth.

7. The antenna packaged substrate according to claim 1, wherein an expansion coefficient of the second dielectric layer ranges from 6 PPM to 10 PPM.

8. The antenna packaged substrate according to claim 1, wherein the bonding layer comprises a resin sheet.

9. The antenna packaged substrate according to claim 1, wherein a material of the substrate comprises a resin material.

10. The antenna packaged substrate according to claim 9, wherein a thickness of the substrate ranges from 220 µm to 280 µm.

11. The antenna packaged substrate according to claim 1, wherein the antenna packaged substrate further comprises a plurality of copper sheets disposed on a side of the dielectric stack that faces away from the substrate, wherein the copper sheets are suspended or grounded, and the copper sheets are electrically insulated from the second antenna radiating patch.

12. The antenna packaged substrate according to claim 1, wherein the antenna packaged substrate further comprises:
a functional stack disposed on a side of the substrate that is opposite to a side on which the first antenna radiating patch is located, and in a direction perpendicular to and gradually away from the substrate, wherein the functional stack comprises a ground shielding layer, a first insulation layer, a feeder layer, a second insulation layer, a signal output layer, and a third insulation layer;
a first feeding structure disposed between the first antenna radiating patch and the feeder layer, wherein the first feeding structure penetrates the substrate and the first insulation layer, a first end of the first feeding structure is electrically connected to the first antenna radiating patch, a second end of the first feeding structure is electrically connected to the feeder layer, and the first feeding structure is electrically insulated from the ground shielding layer; and
a second feeding structure disposed on a side of the feeder layer that faces away from the substrate, wherein the second feeding structure penetrates the second insulation layer and the third insulation layer, one end of the second feeding structure close to the feeder layer is electrically connected to the feeder layer, and the second feeding structure is electrically insulated from the signal output layer.

13. A packaged antenna, comprising:
a radio frequency integrated circuit;
a substrate;
a first antenna radiating patch disposed on a surface of the substrate;
a second antenna radiating patch disposed over the first antenna radiating patch; and
a dielectric stack disposed between the first antenna radiating patch and the second antenna radiating patch, wherein the dielectric stack comprises a first dielectric layer, a bonding layer disposed on a side of the first dielectric layer that faces the first antenna radiating patch, and a second dielectric layer disposed on a side of the first dielectric layer that faces the second antenna radiating patch, wherein
a dielectric constant of the first dielectric layer is lower than a dielectric constant of the substrate, an expansion coefficient of the second dielectric layer is lower than an expansion coefficient of the first dielectric layer, and the radio frequency integrated circuit is mounted on a side that is opposite to a side on which the second antenna radiating patch is located.

14. A terminal, comprising:
a circuit board, wherein the terminal further comprises a packaged antenna mounted on the circuit board, the packaged antenna comprising:
a radio frequency integrated circuit;
a substrate;
a first antenna radiating patch disposed on a surface of the substrate;
a second antenna radiating patch disposed over the first antenna radiating patch; and
a dielectric stack disposed between the first antenna radiating patch and the second antenna radiating patch, wherein the dielectric stack comprises a first dielectric layer, a bonding layer disposed on a side of the first dielectric layer that faces the first antenna radiating patch, and a second dielectric layer disposed on a side of the first dielectric layer that faces the second antenna radiating patch, wherein
a dielectric constant of the first dielectric layer is lower than a dielectric constant of the substrate, an expansion coefficient of the second dielectric layer is lower than an expansion coefficient of the first dielectric layer, and the radio frequency integrated circuit is mounted on a side that is opposite to a side on which the second antenna radiating patch is located and faces the circuit board.

15. The terminal of claim 14, wherein a material of the first dielectric layer comprises a polytetrafluoroethylene material.

16. The terminal of claim 15, wherein the material of the first dielectric layer further comprises a filler added to the polytetrafluoroethylene material, and the filler is used to enhance rigidity of the first dielectric layer.

17. The terminal of claim 16, wherein the filler comprises at least one of glass powder, ceramic powder, or glass fiber cloth.

18. The terminal of claim 14, wherein a value range of a proportion of a thickness of the first dielectric layer to a total thickness of the dielectric stack is 80% to 90%.

19. The terminal of claim 14, wherein the second dielectric layer comprises a resin sheet containing glass fiber cloth.

20. A method of manufacturing an antenna packaged substrate, comprising:
providing a substrate, and manufacturing a first antenna radiating patch on a surface of the substrate;
forming a dielectric stack on the first antenna radiating patch, wherein in a direction perpendicular to and gradually away from the substrate, the dielectric stack comprises a bonding layer, a first dielectric layer, and a second dielectric layer, wherein a dielectric constant of the first dielectric layer is lower than a dielectric constant of the substrate, and an expansion coefficient of the second dielectric layer is lower than an expansion coefficient of the first dielectric layer; and
manufacturing a second antenna radiating patch on a surface that is of the dielectric stack and faces away from the substrate.

* * * * *